March 3, 1964
C. E. ADLER ETAL
3,122,995
TICKET PRINTER AND CUTTER
Filed Feb. 6, 1959
9 Sheets-Sheet 1
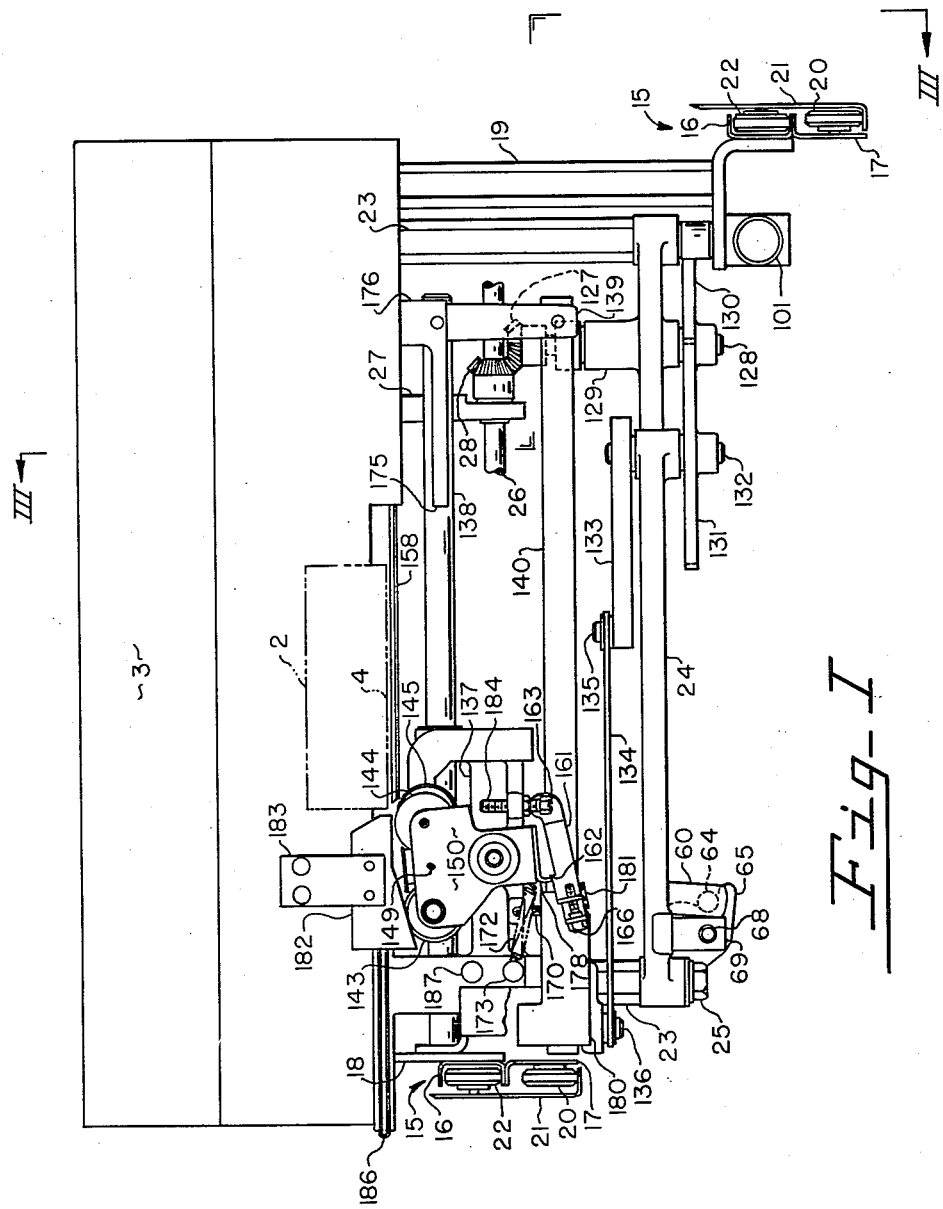
Fig-I
INVENTORS
CLARENCE E. ADLER
FREDERICK C. CARROLL
BY
*Marshall, Marshall & Yeasting*
ATTORNEYS

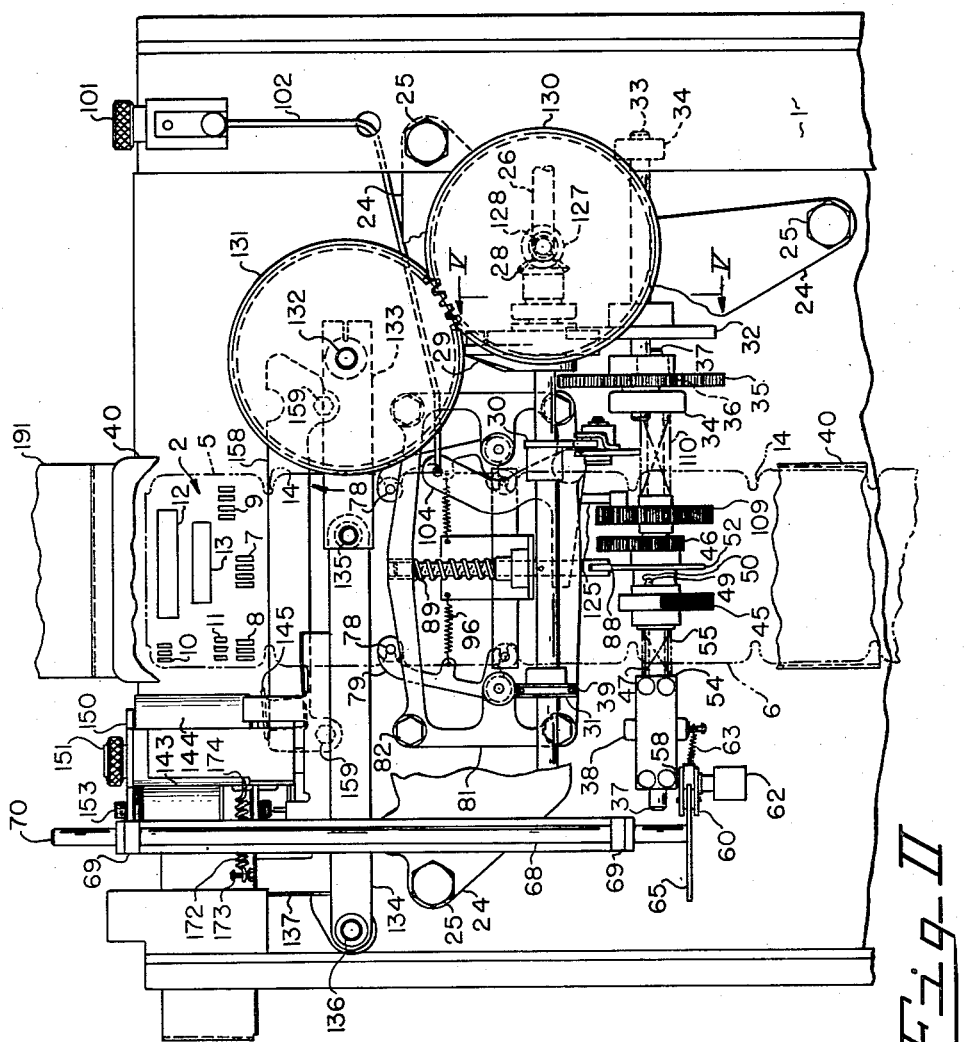

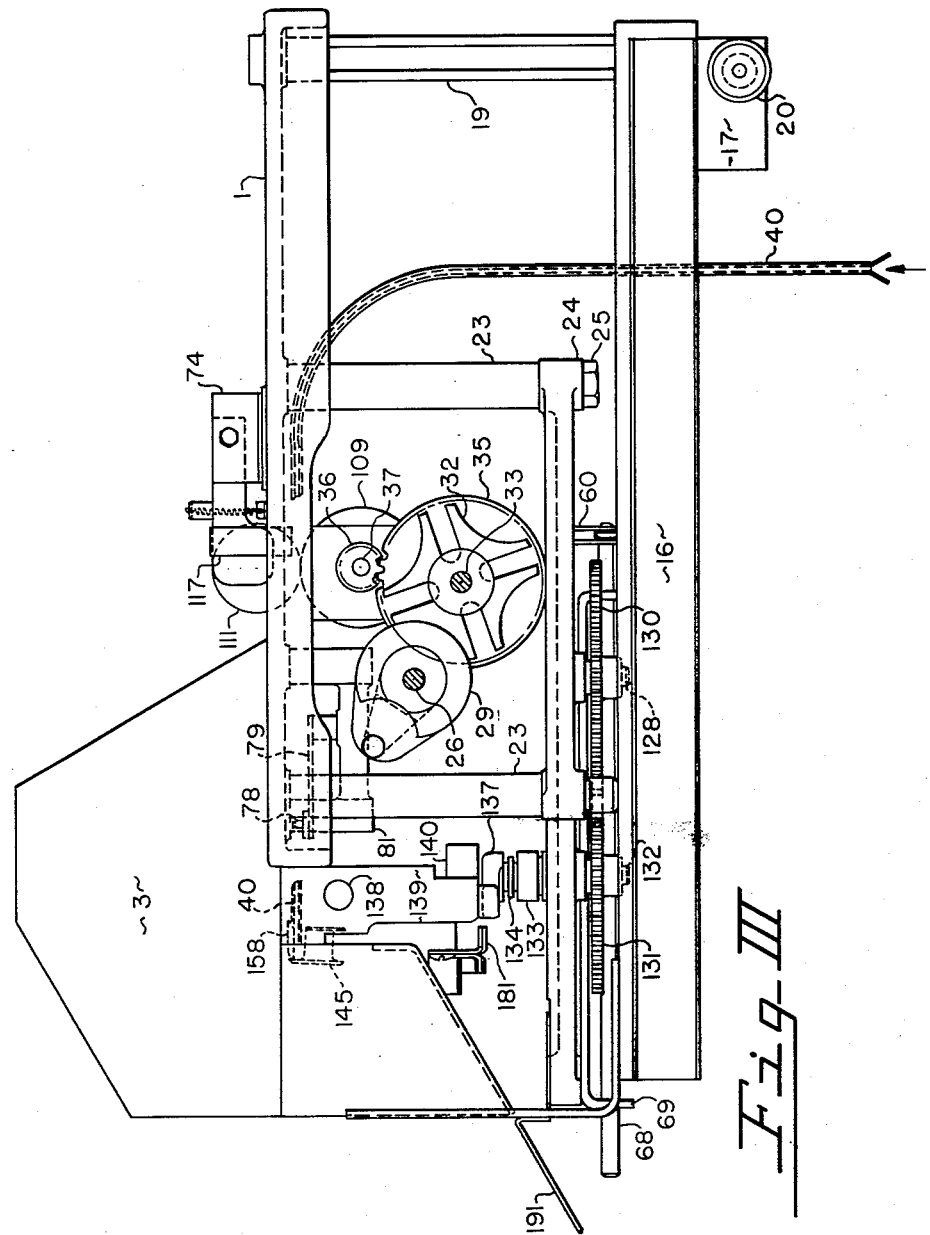

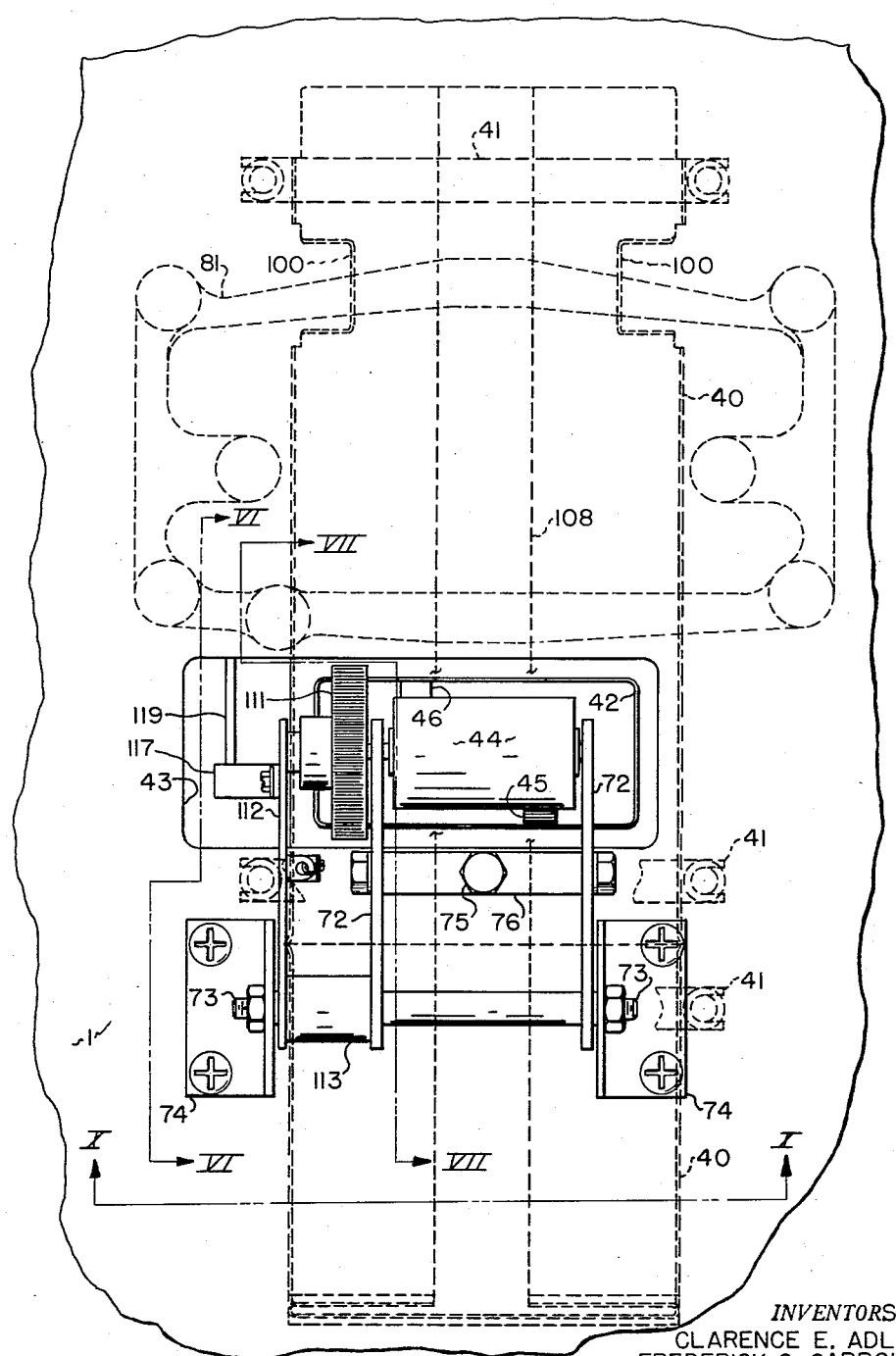

March 3, 1964     C. E. ADLER ETAL     3,122,995
TICKET PRINTER AND CUTTER
Filed Feb. 6, 1959     9 Sheets—Sheet 5
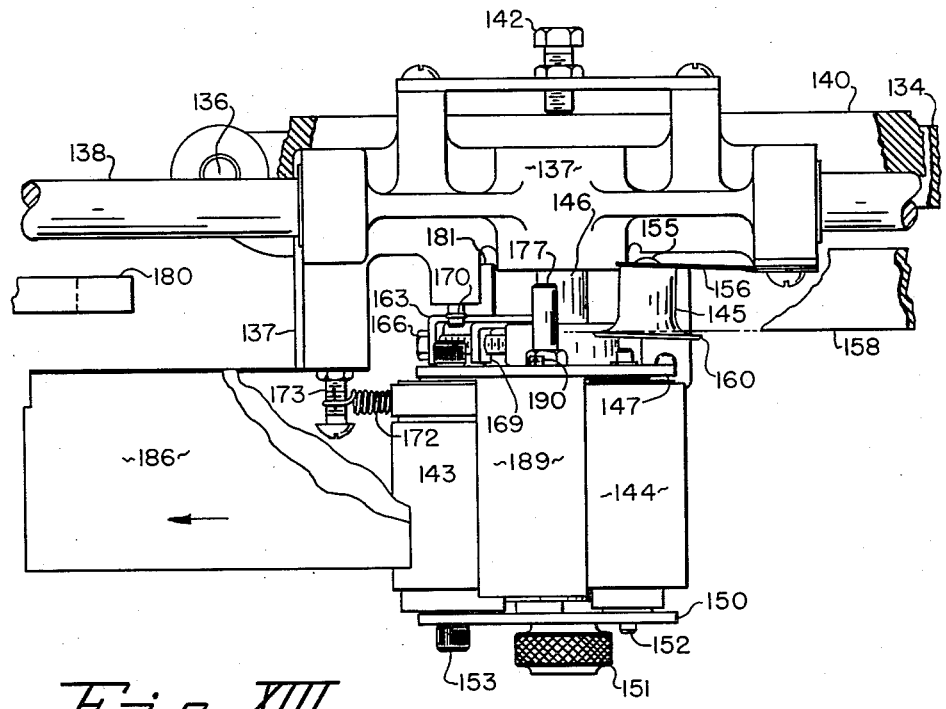
Fig. XIII
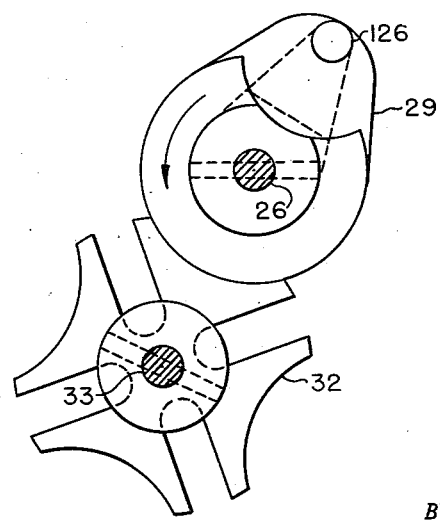
Fig. V
INVENTORS
CLARENCE E. ADLER
FREDERICK C. CARROLL
BY
Marshall, Marshall & Yeasting
ATTORNEYS

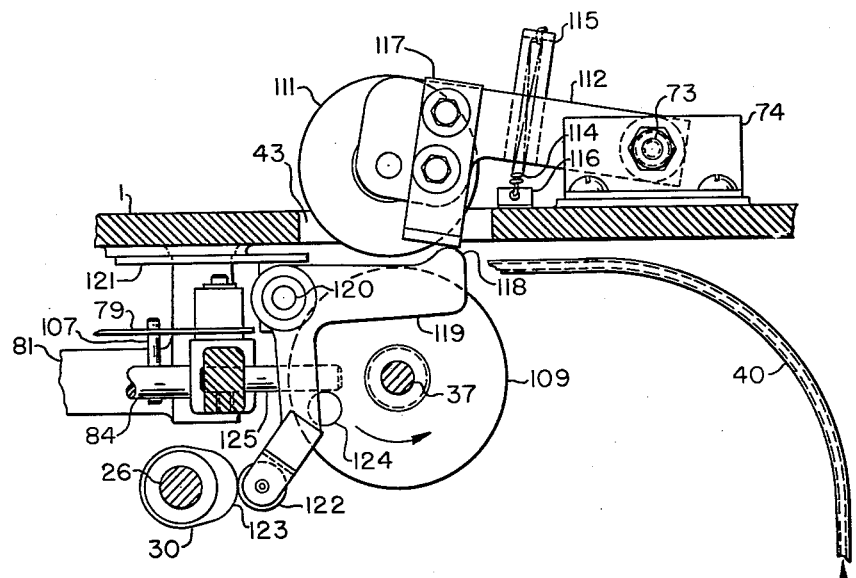
Fig. VI
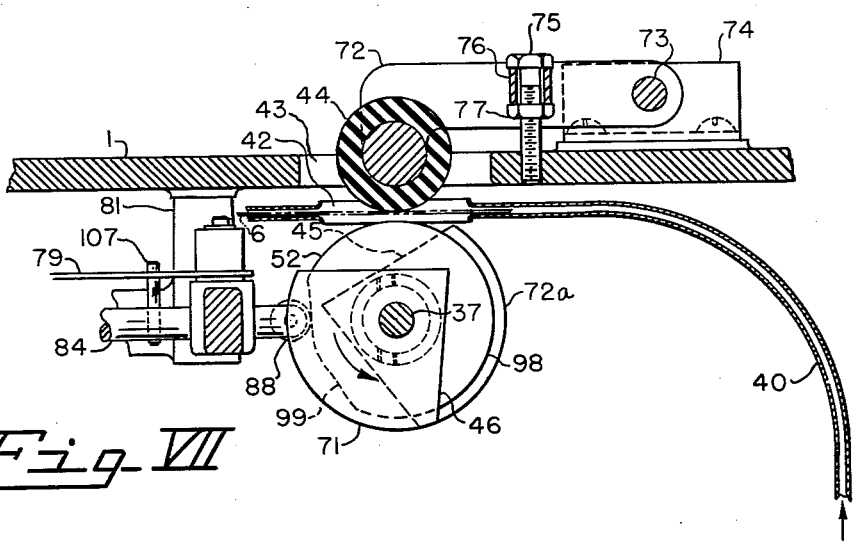
Fig. VII

March 3, 1964 C. E. ADLER ETAL 3,122,995
TICKET PRINTER AND CUTTER
Filed Feb. 6, 1959 9 Sheets-Sheet 7
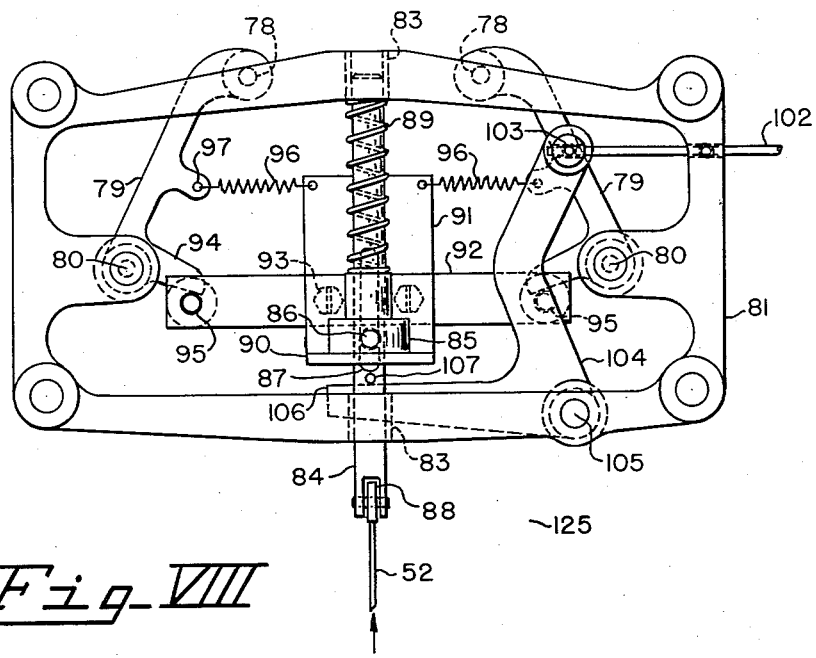
_Fig. VIII_
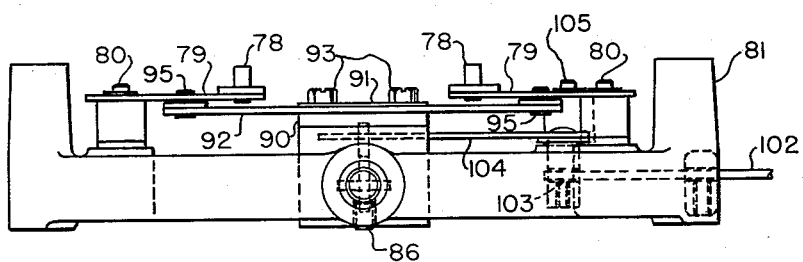
_Fig. IX_
INVENTORS
CLARENCE E. ADLER
FREDERICK C. CARROLL
BY
Marshall, Marshall & Yeating
ATTORNEYS

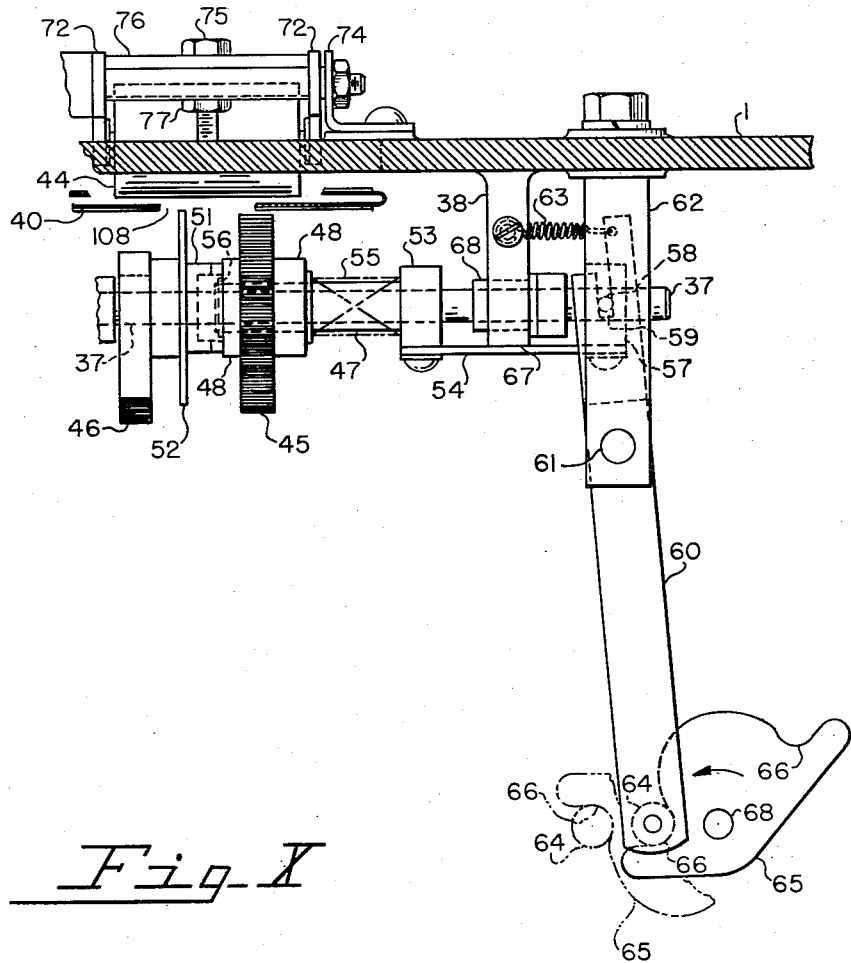

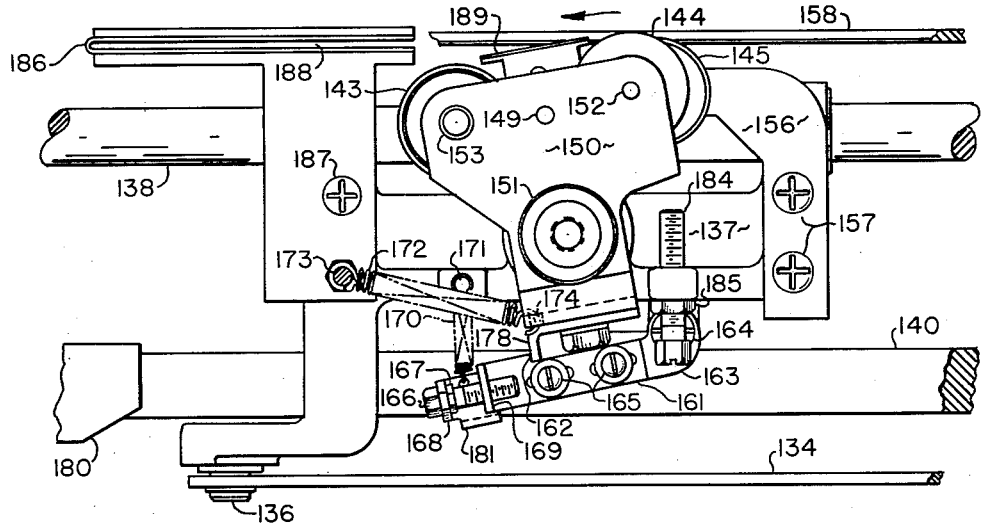
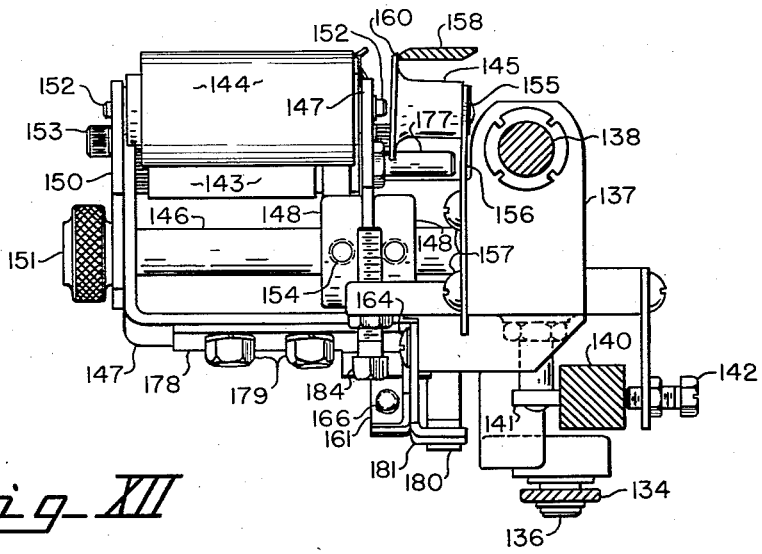

United States Patent Office 3,122,995
Patented Mar. 3, 1964

3,122,995
TICKET PRINTER AND CUTTER
Clarence E. Adler and Frederick C. Carroll, Toledo, Ohio, assignors to Toledo Scale Corporation, Toledo, Ohio, a corporation of Ohio
Filed Feb. 6, 1959, Ser. No. 791,728
18 Claims. (Cl. 101—66)

This invention relates generally to printing apparatus, and more particularly to a printer which is adapted to print and issue tickets, labels, or the like.

The printer is described, for the purpose of illustration, in connection with a weighing scale, the scale and the printer being constructed as a unit to weight commodities and to issue a printed ticket bearing thereon the net weight, price per pound, and computed value of a weighed commodity together with such variable data as the date, store code, commodity name, and commodity grade.

The printer is of the type which intermittently advances, prints, and cuts off successive tickets, labels, or the like from a strip. Heretofore, printers of this type had individual devices for inking the printing type, pressing the element to be printed against the type, and cutting the printed element from the strip. This caused the prior printers to be bulky, slow, expensive, and apt to get out of order.

The weighing scale is particularly useful for food markets of the self-service type selling commodities such as meat in prepackaged form, with the printed labels of predetermined length being attached to or placed within the packages. When the commodities are prepackaged in sacks, it is desirable that labels issued by the printer be double such predetermined length so that the labels can be folded in half and stapled to the tops of the sacks to close them. Furthermore, since the individual elements of the strip are identified by preprinted designs to such an extent that the printing of the results of the weighing operation and the other variable data and the cut off line must be accurately registered, it also is desirable that the strip be fed accurately through the printer.

It is, accordingly, the principal object of this invention to provide a compact, yet rugged, printing mechanism which is operable at very high speeds.

Another object of the invention is to provide a roller mechanism which is adapted to press an element to be printed against printing type and which also is adapted to ink such type and/or to cut the printed element from a strip thereof.

A further object of the invention is to provide means for feeding a strip composed of multiple elements which so advances the strip in accurately controlled steps that exactly a length of the strip equal to a single element is advanced during each cycle.

A still further object of the invention is to provide, in combination with the foregoing strip feeding means, selectively operated means for issuing a ticket, label, or the like of a predetermined length or in a multiple of such length.

Still another object of the invention is to provide an improved printer for printing and issuing tickets, labels, or the like.

These and more specific objects and advantages are apparent from the following description of a preferred embodiment of the invention.

According to a specific embodiment of the invention, a printer of the type which prints and issues tickets, labels, or the like features a roller mechanism which is adapted to ink printing type on a forward stroke and to press an element to be printed against the inked type on the return stroke, the roller mechanism being further adapted to cut the printed element from a strip thereof on such return stroke. Because the inking, printing, and cutting off are done by a single mechanism, the operations are accomplished at very high speeds and the printed matter and the cut off line are located accurately. The individual elements of the strip are identified by preprinted designs to such an extent that the final printing and the cut off which are performed by the roller mechanism must be accurately registered. Furthermore, the combining of means for inking, printing, and cutting off in a single mechanism results in a compact device which is of low cost and which has a rugged design. Most important, the roller mechanism of the invention produces printed tickets, labels, or the like of the highest quality.

Since the individual elements of the strips are identified by preprinted designs, the printer is required only to print the results of the weighing operation and the other variable data hereinbefore mentioned. In order that the strip be fed accurately to the roller mechanism so that the matter which is printed by the printer registers properly with respect to the preprinted designs and so that the cut off occurs at the correct place, a strip feeder is provided which so advances the strip in accurately controlled steps that exactly a length of the strip equal to a single element is fed to the roller mechanism during each cycle.

The roller inking, printing, and cut off mechanism and the strip feeder are so combined that the overall printer is of a compact design and is particularly suitable for incorporation with a weighing scale, the scale and the printer being constructed as a unit to weigh commodities and to issue a printed ticket bearing thereon the net weight, price per pound, and computed value of a weighed commodity together with such variable data as the date, store code, commodity name, and commodity grade. However, the printer of the invention is adapted to print and issue tickets, labels, or the like for other purposes in conjunction with machines other than weighing scales or as an independent unit.

The printer also features, in combination with the foregoing strip feeding means, selectively operated means for causing the feeding means to issue either a ticket, label, or the like of a predetermined length or a multiple of such length. Double length labels, for example, are folded in half and stapled to the tops of sacks to close them.

A preferred embodiment of the invention is illustrated in the accompanying drawings.

In the drawings:

FIG. 1 is a front elevational view of the printer of the invention showing its general arrangement;

FIG. II is a plan view as seen from a position underneath the printer illustrated in FIG. I looking up toward the printer;

FIG. III is an end elevational view as seen from a position substantially along the line III—III of FIG. I;

FIG. IV is a fragmentary plan view as seen from a position above the printer illustrated in FIG. III looking down upon the printer;

FIG. V is a sectional view taken along the line V—V of FIG. II;

FIG. VI is a vertical sectional view taken along the line VI—VI of FIG IV;

FIG. VII is a vertical sectional view taken along the line VII—VII of FIG. IV;

FIG. VIII is an enlarged view of the indexing part of the strip feeding apparatus which is illustrated in FIG. II incorporated in the printer;

FIG. IX is an elevational view of the device which is shown in FIG. VIII as seen from a position at the top of FIG. VIII looking toward the device;

FIG. X is a vertical sectional view taken along the line X—X of FIG. IV;

FIG. XI is an enlarged view of the roller, inking, printing, and cut off mechanism which is illustrated in FIG. I incorporated in the printer;

FIG. XII is an elevational view of the device illustrated in FIG. XI as seen from a position to the right of the device; and FIG. XIII is a plan view of the device illustrated in FIG. XI as seen from a position above the device.

These specific figures and the accompanying description are intended merely to illustrate the invention but not to impose limitations on the claims.

Referring to FIGS. I–IV, the printer includes a frame member 1 from which most of the parts of the printer are hung. Above the frame member 1 is a printing station 2 (FIG. I) in which suitable printing type bearing elements are located. These type bearing elements, which can be printing wheels or plates, are not illustrated for the sake of simplicity. The printer is constructed as a unit with a weighing scale (not shown) to weight commodities and to issue a printed ticket bearing thereon the net weight, price per pound, and computed value of a weighed commodity together with such variable data as the date, store code, commodity name, and commodity grade. Mechanism which operatively connects certain of the type bearing elements to the weighing scale for automatically setting up such elements to print the net weight and the computed value are contained within a case 3 which is supported by the frame member 1. Other ones of the type bearing elements are set up by manually operated mechanism which also is contained within the case 3. For a clear understanding of the structure and function of the printer of the invention it is necessary only to know that ordinary printing type are set up in a horizontal plane which contains line 4 of the printing station 2 and these can be pictured as being set up all by hand for the sake of simplicity.

An illustrative example of a ticket 5 issued by the printer in conjunction with the weighing scale for use in prepackaging meat is shown in FIG. II, the ticket 5 being part of a strip 6 of tickets. Certain information (not shown) such as the name of the store and headings for the matter to be printed may be preprinted on the ticket, the printer printing the net weight, price per pound, computed value, date, store code, commodity name, and commodity grade at 7, 8, 9, 10, 11, 12 and 13, respectively. The edges of that one of the tickets to which the reference numeral 5 is applied define the horizontal limits of the printing station 2. The ticket strip 6 is provided along its edges with notches 14 which are located in pairs in accurately spaced relation lengthwise of the strip. The lengthwise distance between any two of the notches 14 is equal to the desired dimension of an individual ticket 5.

The frame member 1 of the printer is mounted on a pair of tracks 15 each of which includes a channel 16 from which depends an inverted L-shaped bracket 17, the left hand channel 16 as viewed in FIG. I being connected to the bottom of the frame member 1 by means of a plurality of legs 18 and the right hand channel 16 being connected to the bottom of the frame member 1 by means of a plurality of legs 19. Each of the inverted L-shaped brackets 17 carries a roller 20 which runs on the stationary tracks 21 of a cabinet (not shown) and each of the stationary tracks 21 carries a roller 22 which cooperates with the channels 16 so that the printer can be moved in and out of the cabinet like a drawer.

Three posts 23, two of which are shown in FIG. III, depend from the frame member 1 and function to support a shelf-like casting 24 which is connected to the three posts 23 by means of three screws 25 that are shown in FIG. II, the casting 24 being broken away in FIG. II to reveal the mechanism above it. A horizontal main drive shaft 26, which is journaled in legs 27 depending from the frame member 1 only one of which is shown (FIG. I), has secured thereto a miter gear 28, a Geneva driver 29, a cam 30 and a sheave 31 and is turned one revolution for each printing cycle. The nature of the drive means for turning the shaft 26 is not shown for the stake of simplicity and since it is not critical for the purposes of the invention beyond the requirement that the shaft 26 be turned one revolution for each printing cycle, it being convenient to connect the drive means to the shaft 26 at the broken away right hand end of the shaft as viewed in FIGS. I and II.

Turning of the drive shaft 26 through one revolution causes the Geneva driver 29 which turns as one therewith to turn a Geneva gear 32, with which the driver 29 cooperates, ninety degrees, the Geneva gear 32 being secured to a horizontal shaft 33 which is journaled in a pair of spaced legs 34 depending from the frame member 1. Also secured to the shaft 33 is a gear 35 which meshes with a pinion 36 that is secured to a horizontal shaft 37 which is journaled in legs 38 one of which is shown in FIGS. II and X and which depend from the frame member 1. Turning of the Geneva gear 32 ninety degrees causes the gear 35 which turns as one therewith to turn ninety degrees. The ratio between the gear 35 and the pinion 36 is such that the pinion 36 is turned one revolution for each one-quarter revolution of the gear 35 meshed therewith.

The shaft 37 is the drive shaft for mechanism for feeding the tickets to the printing station 2; this mechanism includes a supply roll, which is not shown but which is shown and described in copending U.S. application Ser. No. 761,622 filed September 17, 1958 in the name of F. C. Carroll, that is turned to feed off labels by means of the sheave 31 which is connected to such supply roll through a drive cable 39 (FIG. II), the sheave 31 being turned one revolution by the shaft 26 for each printing cycle. The ticket strip 6 is fed from the supply roll through a chute 40 that is attached to the lower side of the frame member 1 by means of straps 41 (FIG. IV) and that has openings 42 in its upper and lower walls which are juxtaposed to an opening 43 in the frame member 1 through which the ticket strip may be engaged for feeding by a driven pressure roller 44 in cooperation with a driving double ticket cam 45 and a driving single ticket cam 46.

The double ticket feeding cam 45 is loosely journaled on a sleeve 47 (FIGS. II and X) which is slidable axially on the shaft 37 and has a hub 48 with axially extending teeth 49 which mate with notches 50 (FIG. II) in a hub 51 of a finger drive cam 52, the purpose of which cam 52 is described hereinafter, which is secured to the single ticket cam 46 to turn as one therewith, the single ticket cam 46 being secured in turn to the shaft 37 to be driven thereby. The sleeve 47 is provided, at its right hand end as viewed in FIG. X, with a block 53 that is fixed to a slidable plate 54 and that functions to compress a spring 55 between it and the hub 48 of the double ticket feeding cam 45. The spring 55 urges the cam 45 against a clip 56 that is received in a circumferential groove in the sleeve 47 and that functions to keep the cam 45 on the sleeve 47. The slidable plate 54 also is fixed to a block 57 which is provided with a horizontally extending pin 58 (FIGS. II and X) that is received in a notch 59 at the top of a cam follower 60 which is pivoted at 61 on a leg 62 depending from the frame member 1 and which is urged in a counterclockwise direction as viewed in FIG. X by an extension coil 63 interconnecting the leg 38 and the top of the cam follower 60. The coil 63 urges a roller 64 on the bottom of the cam follower 60 against a cam 65 which has a pair of low peripheral roller locking portions 66.

When the cam 65 occupies its position shown in solid lines in FIG. X, the extension coil 63 maintains the teeth 49 on the hub 48 of the double ticket cam 45 in engagement with the notches 50 in the hub 51 of the finger drive cam 52. When so engaged, the cams 45, 52, and 46 turn as one, the drive being from the shaft 37 and cams 46 and 52 fixed to the shaft 37 to the cam 45 which turns on the sleeve 47. When the cam 65 is turned counterclockwise to its position shown fragmentarily in broken lines in FIG. X, the cam follower 60 is pivoted clockwise about its pivot 61, the coil 63 is extended, and the sleeve 47 which is connected to the top of the cam follower 60 through the slidable plate 54, block 57, and pin 58 is moved to the right to withdraw the double ticket cam 45 from the cam 52. In either position of the cam 65, the roller 64 is locked in the respective low peripheral portion 66. When so disengaged, turning of the cams 46 and 52 does not affect the double ticket cam 45 which is loosely journaled on the sleeve 47. The plate 54 is guided as it slides back and forth by the lower surface 67 of the leg 38 which contains a bushing 68 in which the shaft 37 turns. Should the teeth 49 be slightly misaligned with the notches 50 when the cam 65 is turned to engage them, the spring 55 takes up any shock, the double ticket cam 45 being urged continuously toward the cam 52 so that when the shaft 37 turns the cam 52 enough to align the notches 50 with the teeth 49 the teeth slide into the notches. The cam 65 is manually operated by means of a cam shaft 68 which is journaled in a bracket 69 (FIG. II) fixed to the bottom of the casting 24. An end 70 of the cam shaft 68 is located exteriorly of the printer for the reception of a knob (not shown).

Every time that the shaft 37 is turned one revolution, the single ticket cam 46 makes one revolution and during the interval while a knurled portion 71 (FIG. VII) of the cam 46 is in pressure engagement with the ticket strip 6 and the roller 44 the strip is fed forward a distance which is slightly in excess of the length of a single ticket. Should the double ticket cam 45 be connected to the single ticket cam 46, a knurled portion 72a of the double ticket cam 45 during the interval while the knurled portion 72a is in pressure engagement with the ticket strip 6 and the roller 44 also feeds the strip forward a distance which is about equal to the length of a single ticket. The cams 45 and 46 when they are operatively connected assume the orientation relative to each other shown in FIG. VII; they are shown in FIG. VII in their positions at the start of a printing cycle. The cams are driven counterclockwise by the shaft 37. First the knurled portion 72a of the double ticket cam 45 feeds the strip forward and then the knurled portion 71 of the single ticket cam 46 feeds the strip forward additionally. Should the double ticket cam 45 be disengaged from the single ticket cam 46 it does nothing and only the single ticket cam 46 feeds the strip forward.

The driven roller 44 is a cylinder which is long enough as shown in FIG. IV to cooperate with both of the feed cams 45 and 46; it is journaled in and between arms 72 which are pivoted on an axle 73 that is supported between a pair of angle brackets 74 on top of the frame member 1 and is positioned vertically for adjustment of the pressure on the feed cams 45 and 46 by means of an adjustment screw 75 that is threaded into the top of the frame member 1 and that is connected to the arms 72 by means of a bar 76 extending therebetween. The bar 76 is clamped in adjusted position between the shoulder on the head of the adjustment screw 75 and a nut 77 (FIGS. VII and X) threaded on the screw.

When the commodities are prepackaged in sacks, it is desirable that tickets issued by the printer be double the predetermined length which is convenient for use, for example, in labeling prepackaged packages of meat so that the labels can be folded in half and stapled to the tops of the sacks to close them. One of the features of the printer is the provision of the convenient to use, simple, and accurate means for the selective issuance of either a single or a double ticket. The selection is accomplished by turning the cam 65 to its position shown in solid lines in FIG. X to connect the double ticket cam 45 to the single ticket cam 46 so that the cams turn as one to issue a double ticket or by turning the cam 65 to its position shown fragmentarily in broken lines in FIG. X to withdraw the double ticket cam 45 to its inoperative position to issue a single ticket. When a single ticket is to be issued, the ticket strip 6 is advanced finally a distance equal to the desired dimension of an individual ticket and such ticket is printed in the printing station 2. When a double ticket is to be issued, the ticket strip is advanced finally a distance equal to twice the desired dimension of an individual ticket, one of the tickets being advanced beyond the printing station 2 so that it remains blank and the other being printed in the usual way in the printing station 2.

Accurate register of each successive ticket 5 with relation to the printing station 2 and a ticket cut off device hereinafter described is established by first feeding the ticket strip 6 forward a distance slightly greater than the length of a single ticket 5 in the case a single ticket is to be issued or a distance slightly greater than the length of a double ticket in the case a double ticket is to be issued. Then, the strip is fed in the reverse direction to engage a pair of the edge notches 14 in a ticket 5 with stop members located in a position spaced from the printing station by a distance accurately correlated with the length of one or more complete tickets 5 such that the printing and the cut off take place in the desired places.

The stop members each include a stop pin 78 (FIGS. II, VIII, and IX) of a size to be received in an edge notch 14 in a ticket 5 on the extended end of a bell-crank index finger 79 that is pivoted at 80 on a frame 81 which is secured by means of screws 82 to the bottom of the frame member 1. The position of the frame 81 relative to the rest of the printer can be seen in FIGS. II, III, IV, VI, and VII. The frame 81 is provided with a pair of aligned holes 83 for the reception of a plunger 84 which is secured to a hub 85 by means of a set screw 86 that cooperates with a flat area 87 on the plunger and which carries a cam following roller 88 at an extended end. A compression coil spring 89 around the plunger 84 between the frame 81 and the hub 85 urges the roller 88 against the finger drive cam 52. An angle bracket 90, secured to the hub 85, carries a horizontal plate 91 and a horizontal bar 92 both of which are attached to the bracket 90 by means of screws 93. Hence, axial movement of the plunger 84 causes movement of the plate 91 and the bar 92 which move as one. Projections 94 on the fingers 79 are held against pins 95 on the ends of the bar 92 by means of extension springs 96 interconnecting the plate 91 and the fingers 79, the springs 96 being connected to the fingers 79 at points 97 intermediate the pins 78 on the fingers and the pivots 80 for the fingers.

The finger drive cam 52 has a high part 98 (FIG. VII) and a low part 99. It is positioned at the beginning of a printing cycle as shown in FIG. VII. Assuming that the double ticket feed cam 45 is disconnected from the single ticket feed cam 46 to simplify the description, a counterclockwise revolution of the shaft 37 moves the high part 98 on the finger drive cam 52 against the roller 88 on the plunger 84 moving the plunger to the left as viewed in FIG. VII. This moves the pins 95 on the bar 92 in the same direction to pivot the fingers 79 about their pivots 80 in opposition to the springs 96 which normally pull the stop pins 78 on the fingers 79 against the edges of the tickets 5, such edges of the tickets being exposed to the stop pins 78 in side openings 100 (FIG. IV) in the chute 40. Such pivoting of the fingers 79 moves the stop pins 78 out of contact with the edges of the tickets so that during the interval while the knurled portion 71 of the single ticket feed cam 46 is in pressure engagement with the strip 6 and the roller 44 the strip is fed forward without hindrance.

The fingers 79 also can be pivoted about their pivots 80 to get the stop pins 78 on the fingers out of the way when a new strip of tickets is started through the printer by pulling on a knob 101 (FIG. II) secured to the end of a cable 102 which is attached at 103 to an arm of a bell crank 104, the bell crank 104 being pivoted at 105 on the frame 81 and having an arm 106 which engages a vertical pin 107 fixed in the plunger 84. This moves the plunger 84 ahead to open the fingers 79 in the same way that the fingers 79 are opened when the finger drive cam 52 drives the plunger ahead. The starting of the new ticket strip 6 through the printer is facilitated by the provision of a longitudinally extending slot 108 (FIG. IV) in the chute 40 through which one may extend a finger to move the strip 6.

While the fingers 79 are in their open positions, the ticket strip 6 is fed forward a distance slightly greater (perhaps one-eighth to three-quarter inch) than the length of a single ticket. Then the low spot 99 on the finger drive cam 52 allows the spring 89 to move the plunger 84 back permitting the springs 96 to pull the fingers 79 toward the ticket strip 6 to engage the stop pins 78 on the fingers with the edges of the tickets. In this position of the finger drive cam 52, the knurled portion 71 of the feed cam 46 is out of pressure engagement with the strip 6 and roller 44 and the strip 6 is free to be fed in the reverse direction while the spring biased stop pins 78 drag on the edges of the ticket strip and until the spring biased stop pins 78 on the fingers 79 fall into a pair of edge notches 14 in the strip. This accurately positions a ticket 5 as illustrated in FIG. II in the printing station 2 so that the printing and the ticket cut off occur in the right places.

The reverse feeding movement of the ticket strip 6 following each forward feeding movement is obtained by means of a wheel 109 which is freely journaled on the shaft 37 and to which a coil spring 110 (FIG. II) surrounding the shaft 37 is secured, the spring 110 being anchored in the stationary leg 34 so that the wheel 109 and spring 110 can be wound up like a window shade by the ticket strip 6 during its forward movement. The wheel 109 is in pressure engagement with the ticket strip 6 and a roller 111 (FIGS. IV and VI) during the forward and reverse movement of the ticket strip, the ticket strip driving the wheel 109 on the forward feed and the wheel 109 driving the ticket strip on the reverse feed.

The roller 111 is journaled on an arm 112 which is pivotally mounted on the axle 73, a spacer 113 on the axle separating the arm 112 and the left hand one of the pair of arms 72 as viewed in FIG. IV. The roller 111 is biased downwardly by means of a spring 114 extending between a bracket 115 on the roller arm 112 and a bracket 116 on the top of the frame member 1 and carries an angle bracket 117 which is lifted at the end of a feeding cycle by means of the tip 118 of a bell crank 119. The bell crank 119 is pivotally mounted at 120 on a bracket 121 which is secured to the bottom of the frame member 1 and carries a cam following roller 122 at its lower end, the roller 122 being held against the cam 30 on the main drive shaft 26 by the action of the spring 114.

The roller 111 is shown in FIG. VI in its lifted position at the start of a printing cycle. In this position, a high spot 123 on the cam 30 so holds the bell crank 119 that the tip 118 of the bell crank lifts the roller 111 up in opposition to the spring 114. As soon as a printing cycle is initiated, the high spot 123 on the cam 30 moves away from the roller 122 on the bell crank 119 and the spring 114 forces the roller 111 down into pressure engagement with the ticket strip 6 and the wheel 109. Forward feeding of the ticket strip 6 turns the wheel 109 and winds up the coil spring 110 that is connected to the wheel 109 at its one end and that has its other end anchored. This moves a pin 124 extending horizontally from the wheel 109 away from a stop pin 125 that is fixed in the frame 81 a fraction of one revolution until the forward feed of the ticket strip 6 ceases. When the forward feed ceases, the feed cams 45 and 46 no longer are in pressure engagement with the ticket strip 6 and the roller 44 and the wheel 109 and its spring 110 are free to partly unwind and feed the ticket strip between the wheel 109 and the roller 111 in the reverse direction until the spring biased stop pins 78 on the fingers 79 fall into a pair of edge notches 14 in the ticket strip. When the cam 30 returns to its position shown in FIG. VI at the end of a cycle, it pivots the bell crank 119 counterclockwise about the pivot 120 to again lift the roller 111 and relieve the pressure engagement of the roller 111 with the ticket strip 6 and the wheel 109. The wheel 109 and its spring 110 then are free to unwind additionally until the pin 124 on the wheel 109 engages the stop pin 125 on the frame 81. At this point the spring 110 still has some initial turn left so that the wheel 109 and its spring 110 never completely unwind.

In the complete operation of the feeding mechanism, accurate register of each successive ticket 5 with relation to the printing station 2 and the ticket cut off device is established by first feeding the ticket strip 6 forward while the spring biased stop pins 78 are held clear of the edges of the ticket strip by means of the finger drive cam 52 a distance slightly greater than the length of a single ticket in the case a single ticket is to be issued or a distance slightly greater than the length of a double ticket in the case a double ticket is to be issued. At the end of the forward feed, the knurled portions of the feed cams 45 and 46 move out of pressure engagement with the ticket strip 6 and then backup roller 44 and the wheel 109 by pressure engagement with the ticket strip and its backup roller 111 and under the influence of its spring 110 feeds the ticket strip in the reverse direction while the spring biased stops 78, which at this point no longer are held clear of the ticket strip, drag on the edges of the ticket strip and until the spring biased stops 78 move into a pair of edge notches 14 in the ticket strip. This accurately positions a ticket 5 as illustrated in FIG. II in the printing station 2 so that the printing and the ticket cut off occur in the right places. Single ticket or double ticket feed is selected by manipulation of the cam 65 to disengage the double ticket cam 45 for the issuance of single tickets or to engage the double ticket cam 45 for the issuance of double tickets. The operation of the feeding mechanism is the same for either the single ticket or the double ticket feed, the engagement of the double ticket cam 45 with the single ticket cam 46 in effect merely doubling the effective or operative knurled area of the single ticket cam 46 which can be pictured as a selectively adjustable cam that feeds the ticket strip 6 forward a predetermined distance plus a small increment more. The size of the small increment varies with such factors as the thickness of the ticket strip, but in any case it is accurately canceled in every instance by means of the reverse feed of the ticket strip 6 to engage a pair of the edge notches 14 in a ticket 5 with the accurately located stop members 78.

The Geneva driver 29 and the Geneva gear 32, which is provided with four uniformly spaced radial slots, are positioned at the beginning of a printing cycle as shown in FIG. V, the driver 29 being turned counterclockwise by the main drive shaft 26 as indicated by the arrow. During the first forty percent of the revolution of the main drive shaft 26, the driving end 126 of the Geneva driver 29 travels from its position shown in FIG. V to its cooperating position with the Geneva gear 32. Hence, during the first forty percent of the revolution of the main drive shaft 26, the Geneva gear 32 is not turned and the shaft 37 which is operatively connected to the Geneva gear 32 and which is the drive shaft for the ticket strip feeding mechanism is not turned. This provides a delay in the ticket strip feeding cycle during which the printing type in the printing station 2 are inked.

As soon as the main drive shaft 26 begins to turn after the initiation of a printing cycle, the miter gear 28 on the shaft 26 turns and drives a miter gear 127 atop a vertical shaft 128 journaled in a boss 129 on the casting 24, the shaft 128 carrying at its lower end a gear 130 that meshes with a gear 131 carried on a short vertical shaft 132 that also is journaled in the casting 24. An arm 133 atop the short vertical shaft 132 turns as one with the gear 131 on the shaft, the free end of the arm, which is pivoted to a link 134 at 135, making one revolution in the direction of the arrow in FIG. II during each printing cycle. The link 134 is pivotally connected at 136 to a carriage 137 that is pulled to the right as viewed in FIG. I to a position at the right of the printing station 2 and then pushed to the left to return it to its original position shown in FIG. I by meanss of the link 134 when the right hand end of the link 134 as viewed in FIG. II follows the free end of the arm 133 about in the circular path of such free end of the arm.

The carriage 137 is mounted to reciprocate across the front of the printer on a horizontal round rod 138 which extends between a pair of spaced legs 139 depending from the frame member 1. One of the legs 139 is shown in FIGS. I and III. A square bar 140 which also extends between the spaced legs 139 functions as a guide for the carriage 137 and prevents it from turning about the axis of the round rod 138, a roller 141 (FIG. XII) on the carriage following the surface on one vertical side of the bar 140 and the end of an adjustment screw 142 on the carriage following the surface of the opposite side of the bar. The adjustment screw 142 provides an adjustment for positioning the carriage 137 about the axis of the rod 138. During the forward stroke of the carriage 137, i.e., its stroke from left to right as viewed in FIG. I, an ink roller 143 carried by the carriage 137 inks the type in the printing station 2 and, during the return stroke of the carriage, a platen roller 144 also carried by the carriage presses a ticket 5 against the inked type, a roller cutter 145 that also is carried by the carriage severing the printed ticket 5 from the strip 6 on such return stroke.

One of the important features of the printer is the combining of inking, printing, and cutting means in one compact, low-cost, high-speed, and rugged, trouble-free device. Only the one drive means is required to accomplish the three operations greatly simplifying the synchronization of the events so that they can be timed to occur closely together. Prior printers have individual devices for inking the printing type, pressing the element to be printed against the type, and cutting the printed element from the strip. In the printer of the invention, the type in the printing station 2 are inked by the ink roller 143 on the forward stroke of the carriage 137, then the ticket strip mechanism accurately feeds a blank ticket into the printing station 2 before the carriage reaches the printing station on its return stroke, and then the printing and the cut off occur nearly simultaneously as the platen roller 144 and the cutter 145 roll past the printing station 2 on the return stroke of the carriage, the events happening rapidly with no time lost between their occurrence.

The carriage 137 carries a shaft 146 on which a yoke 147 is pivotally mounted, the yoke 147 being axially located on the shaft 146 by means of a pair of collars 148 between which the right hand arm of the yoke 147 as viewed in FIG. XII is sandwiched. A locating pin 149 (FIG. XI) on the left hand arm of the yoke 147 as viewed in FIG. XII is received in an opening in a plate 150 which also is pivotally mounted on the shaft 146, a knurled nut 151 threaded on the end of the shaft 146 holding the plate 150 in its pin-located position against such left hand arm of the yoke 147. The end of the shaft 146 has a shoulder against which the nut 151 is turned so that the yoke 147 and the plate 150 are free to pivot about the axis of the shaft 146. When the plate 150 is in place, a set of aligned holes in the yoke 147 and plate 150 receives pins 152 extending from the axis of the platen roller 144 which serves to rotatably mount such platen roller and a second set of aligned holes in the yoke 147 and plate 150 receives studs 153 extending from the axis of the ink roller 143 which serves to rotatably mount such ink roller. Alternatively, the yoke 147 and plate 150 can be formed as an integral piece to eliminate the need for the nut 151. With this arrangement, the platen roller is permanently journaled and the ink roller is held by gravity in slots instead of the holes so that it can easily be removed for refilling. In the arrangement shown in the drawings to assemble the yoke, plate, and rollers, the right hand one of the collars 148 as viewed in FIG. XII, the right hand arm of the yoke 147, the other one of the collars, and the other one of the arms of the yoke, are slipped on the shaft 146 in that order, set screws 154 holding the collars in adjusted axial position on the shaft 146. The right hand roller platen pin 152 and the right hand ink roller stud 153 then are put in place, the plate 150 slipped on the shaft 146 and positioned so that the locating pin 149, the left hand roller platen pin 152 and the left hand ink roller stud 153 are properly received therein, and finally the nut 151 is turned into place.

The cutter 145 has the general form of a roller and is rotatably mounted, by means of a stud 155, on a spring-tempered bracket 156 which is secured by means of screws 157 to the carriage 137. The bracket 156 resiliently urges the cutter 145 toward the cutting edge of a stationary knife 158 attached by means of screws 159 (FIG. II) to the frame member 1. A sharp cutting edge 160 on the cutter 145 severs the printed tickets 5 from the strip 6 on the return stroke of the carriage 137 as the roller-like cutter 145 rolls along the edge of the stationary knife 158. As illustrated in FIG. XIII, the spring-tempered bracket 156 urges the cutter 145 toward the stationary knife 158 at an angle so that as the carriage 137 moves from right to left only the leading edge of the movable cutter 145 is pressed against the stationary knife 158. Also, as illustrated in FIG. XII, the bracket 156 resiliently urges the roller cutter 145 toward the knife 158 at a slight angle from the vertical.

A latch 161 having an abutment edge 162 is adjustably mounted on a latch arm 163 which is pivotally mounted by means of a shoulder screw 164 on the carriage 137. Screws 165 which are received in threaded holes in the latch arm 163 and in slots in the latch 161 hold the latch 161 in adjusted position on the latch arm 163, the latch 161 being positionable longitudinally on the latch arm 163 between limits determined by the size of the slots. An adjustment screw 166 which has a pair of spaced shoulders 167 one shoulder on either side of a shoulder 168 on the latch arm 163 is threaded into a shoulder 169 on the latch 161. This forms a push-pull connection so that the turning of the adjustment screw 166 pushes or pulls the latch 161 along the latch arm 163. The latch arm 163 is urged in a clockwise direction as viewed in FIGS. I and XI about the axis of the shoulder screw 164 by means of a spring 170 extending between a pin 171 on the carriage 137 and the end of the latch arm 163 remote from the shoulder screw 164. The yoke 147 is urged in a clockwise direction as viewed in FIGS. I and XI about the axis of the shaft 146 by means of a spring 172 extending between a screw 173 on the carriage 137 and point 174 (FIG. II) on the yoke 147.

When the carriage 137 reaches the end of its forward stroke, a stationary stop 175 (FIG. I) extending horizontally from a vertical leg 176 attached to the frame member 1 strikes a stud 177 (FIGS. XII and XIII) secured to the pivotally mounted yoke 147. This causes the yoke 147 to be pivoted in a counterclockwise direction as viewed in FIGS. I and XI about the axis of the shaft 146 to make a latch plate 178, secured to the bottom of the yoke 147 by means of a pair of screws 179, to become caught by the abutment edge 162 of the latch 161, the abutment edge 162 being resiliently biased toward the latch plate 178 by the spring 170. The latch plate 178 is shown in its latched position in FIG. XI, the arrow in FIG. XI indicating the direction of travel of the carriage 137 while the yoke 147 is latched.

When the carriage reaches the end of its return stroke, a suitably mounted stationary cam 180 strikes a finger 181 on the pivotally mounted latch arm 163. This causes the latch arm 163 to be pivoted in a counterclockwise direction as viewed in FIGS. I and XI about the axis of the shoulder screw 164 to release the latch plate 178 from the abutment edge 162 of the latch 161, the latch plate 178 being resiliently biased away from the latch 161 by the spring 172. The latch plate 178 is shown in its unlatched position in FIG. I. In such position, a suitably mounted cam 182 bearing on the ink roller 143 limits appreciable clockwise pivoting of the yoke 147 about the axis of the shaft 146 under the influence of the spring 172.

Near the beginning of the forward stroke of the carriage 137, i.e., its stroke from left to right as viewed in FIGS. I and XI, the ink roller 143 runs off of the stationary cam 182. This starts the ink roller 143 turning so that by the time it reaches the type in the printing station 2 it already is turning to prevent the type from tearing the surface of the ink roller. If the ink roller 143 is held by gravity in slots in the yoke in the alternative mounting for the ink roller 143 hereinbefore described so that the ink roller 143 can easily be removed for refilling, a bracket 183 which functions to support the cam 182 is hinged so that the cam 182 can be swung out of the way.

As the ink roller 143 runs off of the stationary cam 182, the spring 172, since the latch plate 178 is unlatched at this point in the cycle, pivots the yoke 147 about the axis of the shaft 146 until the yoke 147 strikes the upper end of an adjustment screw 184 carried by the carriage 137. In this position, the ink roller 143 is held under spring pressure against the type in the printing station 2 and inks the type as the carriage makes its forward stroke, and the platen roller 144 is held in an inoperative position below the type. The cutter 145 runs along the stationary knife 158 at this point in the cycle but accomplishes nothing because there is no ticket at this point in the cycle in the printing station 2.

When the carriage 137 reaches the end of its forward stroke, a ticket 5 is fed into the printing station 2 and the latch plate 178 is latched as hereinbefore described. In this position, as indicated in FIG. XI, the platen roller 144 presses a ticket 5 against the inked type as the carriage 137 makes its return stroke and the ink roller 143 is held in an inoperative position below the ticket. The cutter 145 runs along the stationary knife 158 and severs the printed ticket from the ticket strip 6 nearly as soon as it is printed, since the roller cutter 145 follows the platen roller 144 closely. When the carriage reaches the end of its return stroke, the latch plate 178 is unlatched as hereinbefore described and the carriage 137 and yoke 147 is positioned as shown in FIG. I ready for the start of another printing cycle.

There is thus provided a roller mechanism which combines inking, printing, and cutting means in one device, the type in the printing station 2 being inked by the ink roller 143 on the forward stroke of the roller mechanism and the ticket 5 in the printing station being printed and cut off nearly simultaneously as the platen roller 144 and the cutter 145 roll past the printing station on the return stroke.

During the forward stroke of the carriage 137, the ink roller 143 is held under spring pressure against the type in the printing station 2. This pressure is adjusted by turning the adjustment screw 184, held in locked position by means of a lock nut 185, which determines how far the spring 172 is able to pivot the yoke 147 about the axis of the shaft 146. The pressure of the platen roller 144 on the ticket 5 in the printing station is adjusted by turning the adjustment screw 166 which positions the abutment edge 162 on the latch 161 relative to the operative end of the latch plate 178. For example with reference to FIG. XI, if the adjustment screw 166 is turned to advance the abutment edge 162 toward the operative end of the latch plate 178, this will pivot the yoke 147 counterclockwise about the axis of the shaft 146 to increase the pressure applied by the platen roller 144.

At the start of a printing cycle, a ticket guide 186, secured to the carriage 137 by means of screws 187, which has a mouth 188 that opens to the right as shown in FIG. XI is located at the left hand of the printer as viewed in FIG. I. At the end of the forward stroke of the carriage 137, the ticket guide 186 is located directly underneath the printing station 2 in position to receive the ticket 5 to be printed when it is advanced into the printing station. As the carriage is reciprocated in its return stroke, the ticket guide 186 moves to the left as viewed in FIGS. I and XI and the right hand edge of the ticket 5 to be printed is released from the ticket guide 186 at the open mouth 188 of the guide. First, such released right hand edge of the ticket is supported upon a ticket support 189, attached by means of a screw 190 (FIG. XIII) and a nut (not shown) on the stud 177 on the yoke 147, and then it is picked up by the platen roller 144 and pressed against the inked printing type. Further reciprocation of the carriage 137 in its return stroke releases the rest of the ticket from the guide 186 to be pressed by the platen roller 144 against the inked type and cut off by means of the cooperating roller cutter 145 and the stationary knife 158, whereupon the severed ticket falls into a discharge chute 191 (FIG. III) at the front of the printer. When the printer issues a double ticket, the first half of such ticket is advanced through the ticket guide 186 and hangs in space beyond the guide until the other half of the ticket is printed and cut off.

In the overall operation of the printer, the main drive shaft 26 is turned one revolution for each printing cycle. During the first forty percent of the revolution of the main drive shaft 26, the driving end 126 of the Geneva driver 29 travels from its position shown in FIG. V to its cooperating position with the Geneva gear 32. This provides a delay in the ticket strip feeding cycle during which the printing type in the printing station 2 are inked.

As soon as the main drive shaft 26 begins to turn, the link 134, operatively connected to the shaft 26, pulls the carriage 137 across the front of the printer in a forward stroke from left to right as viewed in FIG. I. The angle between the arm 133 to which the link 134 is pivotally connected so changes during the reciprocation of the carriage that the carriage travels at a higher speed in the area of the printing station 2 than it does at the ends of its path. This assists in giving the ticket strip feeding mechanism time to advance a ticket into the printing station after the printing type have been inked but before the carriage returns to the printing station on its return stroke. During the forward stroke of the carriage 137, the latch plate 178 is unlatched as shown in FIG. I and as soon as the ink roller 143 runs off of the stationary cam 182 it is held by spring pressure in operative position to roll ink on the printing type, the platen roller 144 being held in inoperative position during such forward stroke.

After the carriage passes the printing station 2 on its forward stroke and before it returns to the printing station on its return stroke, i.e., as soon as the type are inked, the Geneva gear 32 is turned 90 degrees which gives a one revolution turn to the pinion 36 that meshes with the gear 35 which turns as one with the Geneva gear 32 and the ticket strip 6 is fed forward while the spring biased stop pins 78 are held clear of the edges of the ticket strip by means of the finger drive cam 52 a distance slightly greater than the length of a single ticket in the case a single ticket is to be issued or a distance slightly greater than the length of a double ticket in the case a double ticket is to be issued. At the end of the forward feed, the knurled portions of the feed cam or cams move out of pressure engagement with the ticket strip 6 and their backup roller 44 and the wheel 109 by pressure engagement with the ticket strip and its backup roller 111 and under the influence of its spring 119 feeds the ticket strip in the reverse direction while the spring biased stops 78 drag on the edges of the ticket strip and until the spring biased stops 78 move into a pair of edge notches 14 in the ticket strip. This accurately positions a ticket 5 in the printing station.

Single ticket or double ticket feed is selected by manipulation of the cam 65 to disengage the double ticket cam 45 for the issuance of single tickets or to operatively engage the double ticket cam for the issuance of double tickets.

During the final motion of the Geneva driver 29 while it again is disengaged from the Geneva gear 32 to immobilize the ticket strip feeding mechanism, the carriage 137 is returned to its original position which is shown in FIG. I. During the return stroke of the carriage 137, the latch plate 178 is latched as shown in FIG. XI and the platen roller 144 presses the ticket in the printing station against the inked type, the ink roller 143 being held inoperative during such return stroke. The roller cutter 145 runs along the stationary knife 158 and severs the printed ticket from the ticket strip 6 nearly as soon as it is printed, whereupon the severed printed ticket falls into the gravity discharge chute 191.

The embodiment of the invention herein shown and described is to be regarded as illustrative only and it is to be understood that the invention is susceptible to variation, modification and change within the spirit and scope of the subjoined claims.

Having described the invention, we claim:

1. In a printer, in combination, a printing station, a stationary track adjacent the printing station, a carriage mounted to reciprocate along the track, means for reciprocating the carriage, a pivotally mounted member carried by the carriage, an ink roller carried by the member, a platen roller carried by the member, the member having an inking position wherein the ink roller contacts and inks type in the printing station and the platen roller is in an inoperative position and a printing position wherein the platen roller presses an element to be printed in the printing station against the inked type and the ink roller is in an inoperative position, means for holding the member in the inking position during a forward stroke of the carriage, means for pivoting the member into the printing position at the end of the forward stroke, means for holding the member in its printing position during the return stroke of the carriage, support means for supporting the element in the printing station after the type have been inked, the support means releasing the element just before the platen roller presses the element against the inked type, and means for returning the member to the inking position at the end of the return stroke of the carriage.

2. A printer according to claim 1 wherein means are provided for imparting an initial turn to the ink roller before it reaches the printing station on its forward stroke.

3. In a printer, in combination, a printing station having printing type, a stationary track adjacent the printing station, a carriage mounted to reciprocate along the track, means for reciprocating the carriage, a pivotally mounted member carried by the carriage, roller inking and printing means carried by the member, means carried by the carriage for limiting pivotal movement of the member in one direction to define an inking position of the roller means and for limiting pivotal movement of the member in the reverse direction to define a printing position of the roller means, and a guide carried by and stationary relative to the carriage and having a flat element receiving and supporting surface which receives an element to be printed when it is advanced into the printing station and which supports the element in the printing station, the guide releasing the element before the roller printing means presses the element against the type.

4. A roller inking and printing mechanism comprising, in combination, a carriage, a pivotally mounted member carried by the carriage and having a latch portion, roller inking and printing means carried by the member, the member being pivotal in one direction to bring the roller means into an inking position and being pivotal in the reverse direction to bring the roller means into a printing position, a latch pivotally mounted on the carriage and defining an abutment edge, first resilient means urging the abutment edge of the latch into engagement with the latch portion of the pivotally mounted member to latch the member in one of said positions, and second resilient means for urging the member into said other position when the latch is unlatched.

5. In a printer, in combination, a printing station, a stationary track adjacent the printing station, a carriage mounted to reciprocate along the track, means for reciprocating the carriage, a pivotally mounted member carried by the carriage, roller inking and printing means carried by the member, the member being pivotal in one direction to bring the roller means into an inking position wherein the roller means contacts and inks type in the printing station and being pivotal in the reverse direction to bring the roller means into a printing position wherein the roller means presses an element to be printed in the printing station against the inked type, means for holding the member in the inking position during a forward stroke of the carriage, means for pivoting the member into the printing position at the end of the forward stroke, means for holding the member in its printing position during the return stroke of the carriage, means for returning the member to the inking position at the end of the return stroke of the carriage, and support means carried by the carriage for supporting the element in the printing station after the type have been inked, the support means releasing the element just before the roller printing means presses the element against the inked type.

6. A printer according to claim 5 wherein means are provided for imparting an initial turn to the roller inking means before it reaches the printing station on its forward stroke.

7. In a printer, in combination, a printing station, a stationary track adjacent the printing station, a carriage mounted to reciprocate along the track, means for reciprocating the carriage, a pivotally mounted member carried by the carriage, an ink roller carried by the member, a platen roller carried by the member, the member having an inking position wherein the ink roller contacts and inks type in the printing station and the platen roller is in inoperative position and a printing position wherein the platen roller presses an element to be printed in the printing station against the inked type and the ink roller is in an inoperative position, means for holding the member in the inking position during a forward stroke of the carriage, means for pivoting the member into the printing position at the end of the forward stroke, means for holding the member in its printing position during the return stroke of the carriage, a stationary knife juxtaposed to the printing station, a cutter that is carried by the carriage and that has a cutting edge which moves along the knife as the carriage is reciprocated, the cutter following closely behind the platen roller on the return stroke of the carriage to sever the element from the strip, means for returning the member to the inking position at the end of the return stroke of the carriage, and support means for supporting the element in the printing station after the type have been inked, the support means releasing the element just before the platen roller presses the element against the inked type.

8. In a printer, in combination, a printing station, a stationary track adjacent the printing station, a carriage mounted to reciprocate along the track, means for reciprocating the carriage, a pivotally mounted member carried by the carriage, roller inking and printing means carried by the member, the member being pivotal in one direction to bring the roller means into an inking position wherein the roller means contacts and inks type in the printing station and being pivotal in the reverse direction to bring the roller means into a printing position wherein the roller means presses an element to be printed in the printing station against the inked type, resilient means for holding the member in the inking position during a forward stroke of the carriage, means for advancing an element of a strip of elements to be printed into the printing station after the type have been inked, means for pivoting the member into the printing position in opposition to the resilient means at the end of the forward stroke, a latch for locking the member in its printing position during the return stroke of the carriage, a stationary knife juxtaposed to the printing station, a cutter that is carried by the carriage and that has a cutting edge which moves along the knife as the carriage is reciprocated, the cutter following closely behind the platen roller on the return stroke of the carriage to sever the element from the strip, means for unlatching the latch at the end of the return stroke of the carriage, and support means carried by the carriage for supporting the element in the printing station after the type have been inked, the support means releasing the element just before the roller printing means presses such element against the inked type.

9. In a printer, in combination, a printing station, a track adjacent the printing station, a carriage on the track, means for reciprocating the carriage, a pivotally mounted member carried by the carriage, an ink roller carried by the member, a platen roller carried by the member, the member having an inking position wherein the ink roller contacts and inks type in the printing station and the platen roller is in an inoperative position and a printing position wherein the platen roller presses an element to be printed in the printing station against the inked type and the ink roller is in an inoperative position, a stop on the carriage for defining the inking position of the member, a spring for holding the member against the stop during a forward stroke of the carriage, a latch carried by the carriage for defining the printing position of the member, means for pivoting the member against the latch in opposition to the spring at the end of the forward stroke, the latch functioning additionally to lock the member in its printing position during the return stroke of the carriage, means for unlatching the latch at the end of the return stroke of the carriage, and support means carried by the carriage for supporting the element in the printing station after the type have been inked, the support means releasing the element just before the platen roller presses such element against the inked type.

10. A printer according to claim 9 wherein stationary cutting means is located adjacent the printing station and roller cutting means is carried by the carriage, the cutting means cooperating with each other to sever elements from a strip thereof.

11. A printer according to claim 9 wherein additional support means is carried by the member for supporting the element in an interval between release of the element from the support means carried by the carriage and before pick up of the element by the platen roller.

12. In a printer, in combination, a printing station, a track adjacent the printing station, a reciprocable carriage on the track, a pivotally mounted member carried by the carriage, ink and platen rollers carried by the member, the member having an inking position wherein the ink roller inks type in the printing station and the platen roller is in an inoperative position and a printing position wherein the platen roller presses an element to be printed against the inked type and the ink roller is in an inoperative position, a stop on the carriage defining one of the positions of the member, resilient means for holding the member against the stop, a latch carried by the carriage for positively locking the member in its other position, means at one end of the track for pivoting the member into its latched position in opposition to the resilient means, and means at the other end of the track for unlatching the latch.

13. A combination according to claim 12 wherein the stop is adjustable to provide an adjustable pressure between one of the rollers and the type.

14. A combination according to claim 12 wherein the latch is adjustable to provide an adjustable pressure between one of the rollers and the type.

15. A combination according to claim 12 wherein a roller cutter is carried by the carriage closely behind the platen roller to sever the element from a strip of such elements after said element is printed.

16. In a printer, in combination, a printing station, a track adjacent the printing station, a reciprocable carriage on the track, a pivotally mounted member carried by the carriage, ink and platen rollers carried by the member, the member having an inking position wherein the ink roller inks type in the printing station and the platen roller is in an inoperative position and a printing position wherein the platen roller presses an element to be printed against the inked type and the ink roller is in an inoperative position, means holding the member in one or the other of its positions, and coil spring adjustment means for individually adjusting the pressure with which each of the rollers bears on the type.

17. In a printer, in combination, a printing station, a track adjacent the printing station, a reciprocable carriage on the track, a pivotally mounted member carried by the carriage, ink and platen rollers carried by the member, the member having an inking position wherein the ink roller inks type in the printing station and the platen roller is in an inoperative position and a printing position wherein the platen roller presses an element to be printed against the inked type and the ink roller is in an inoperative position, means comprising a spring for holding the member in one of its positions, and means comprising a second spring for holding the member in the other of its positions, whereby the pressures between the type and each roller can be adjusted individually.

18. In a printer, in combination, a printing station having printing type, a stationary track adjacent the printing station, a carriage mounted to reciprocate along the track, means for reciprocating the carriage, a pivotally mounted member carried by the carriage, inking roller means and printing roller means carried by the member, the member being pivotal in one direction to bring the inking roller means into an inking position and being pivotal in the reverse direction to bring the printing roller means into a printing position, and a support carried by and stationary relative to the pivotally mounted member for supporting an element to be printed just before the element is engaged by the roller printing means.

References Cited in the file of this patent
UNITED STATES PATENTS

| | | |
|---|---|---|
| 483,433 | Duffy | Sept. 27, 1892 |
| 537,658 | Wesel | Apr. 16, 1895 |
| 772,632 | Proctor | Oct. 18, 1904 |
| 781,114 | Wesel | Jan. 31, 1905 |
| 830,617 | Schlesinger | Sept. 11, 1906 |
| 1,305,773 | Cushing et al. | June 3, 1919 |
| 1,778,178 | Baber et al. | Oct. 14, 1930 |
| 1,794,795 | Ohmer | Mar. 3, 1931 |
| 1,955,806 | Hartley | Apr. 24, 1934 |
| 2,039,236 | Meisel | Apr. 28, 1936 |
| 2,178,465 | Behrens | Oct. 31, 1939 |
| 2,380,331 | Ryan | July 10, 1945 |
| 2,572,757 | Powell et al. | Oct. 23, 1951 |
| 2,698,216 | Carroll | Dec. 28, 1954 |
| 2,699,372 | Mosler | Jan. 18, 1955 |
| 2,884,857 | Schwinn et al. | May 5, 1959 |